Patented Nov. 28, 1922.

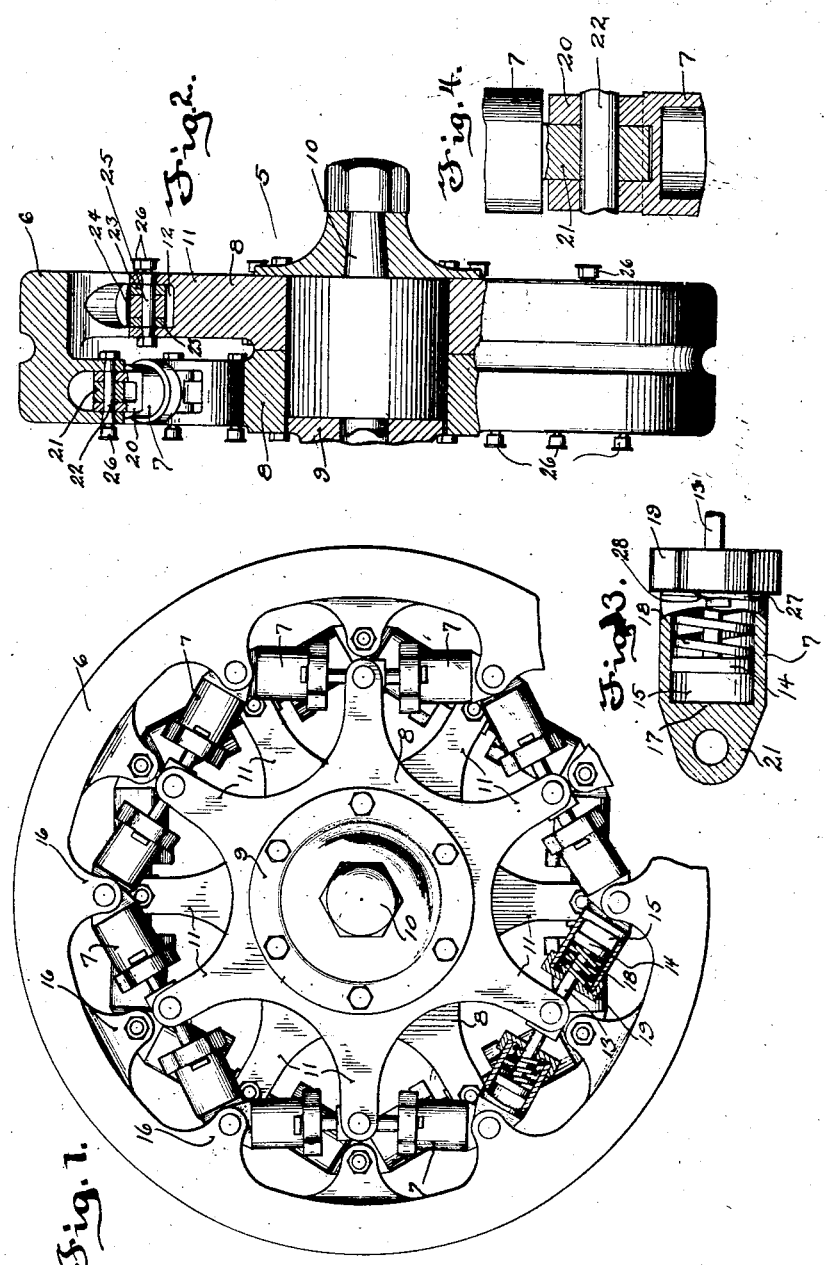

1,436,840

UNITED STATES PATENT OFFICE.

PETER J. WEIRICH, OF ADAMS, WISCONSIN.

VEHICLE WHEEL.

Application filed May 22, 1920. Serial No. 383,451.

*To all whom it may concern:*

Be it known that I, PETER J. WEIRICH, a citizen of the United States, and resident of Adams, in the county of Adams and State of Wisconsin, have invented new and useful Improvements in Vehicle Wheels, of which the following is a description, reference being had to the accompanying drawings, which are a part of this specification.

The present invention relates to certain new and useful improvements in vehicle wheels, and has for one of its objects to provide means within the wheel for absorbing shocks imparted thereto whereby, if desired, the usual resilient tires may be dispensed with.

Another object of this invention is to provide a vehicle wheel of two parts connected together by a plurality of shock absorbing means whereby all movements of the wheel parts with respect to each other will be cushioned.

A further object of this invention is to provide an improved form of cushioning means whereby the movement of the parts thereof in one direction will be yieldingly resisted by a spring and the movement in a reverse direction resisted by an air cushion.

A still further object of this invention is to provide a vehicle wheel so constructed that all shocks imparted thereto by any unevenness in the road's surface will be absorbed by the wheel and thus relieve the strain resulting therefrom from the vehicle, also to provide a wheel which may be constructed with ease and at a comparatively low cost, all things considered, and which may be attached to trucks or vehicles now in general use or to the vehicles at the time of their manufacture.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a side view of a vehicle wheel embodying my invention, parts being broken away and in section to more clearly illustrate structural details;

Figure 2 is a view at right angles to Figure 1, parts being broken away and in section;

Figure 3 is a detail view of one of the shock absorbing devices with a portion thereof broken away and in section to more clearly illustrate the interior construction; and Figure 4 is an enlarged detail view, part in section and part in elevation, illustrating the manner of connecting the shock absorbing devices to the tread or rim member of the wheel.

Referring now more particularly to the accompany drawing, in which like reference characters designate like parts throughout the several views thereof:

My improved wheel consists primarily in two parts, a body portion 5, and a rim or tread member 6, the tread member being connected with the body portion by means of a plurality of shock absorbing devices 7. The body portion is formed of two complementary sections 8 secured upon a suitable hub 9 adapted to be mounted upon a drive axle 10.

The sections 8 are provided with a plurality of radially extending integral arms 11, the arms of one section 8 being staggered with respect to the arms of the other section. The outer ends of the arms 11 are bifurcated as at 12 to receive the outer ends of piston rods 13 which have a piston or plunger head 14 formed on their inner ends and workable within cylinders 15 of the shock absorbing devices 7.

The tread or rim member 6 has its inner periphery provided with as many inwardly extending bifurcated arms or projections 16 as there are arms 11 on both sections of the body member, the arms 16 being on alternate sides of the tread member and the ones in line with the arms of one section being adjacent the side of the tread member opposite said section.

Each shock absorbing device 7 is in the form of a combined pneumatic and spring cushion, the pneumatic cushion being formed between the piston 14 and the closed end 17 of the cylinder and the spring cushion being formed by an extensile spring 18 confined between the plunger 14 and the removable cap 19 closing the other end of the cylinder, and through which the rod 13 passes. With the wheel parts in their normal positions, as depicted in Figure 1, the plunger 14 will be substantially as depicted in Figure 3, the fluid between the plunger and the cylinder end 17 slightly compressed and the spring 18 also partly compressed.

With the plunger in this position, a movement thereof to the left, with reference to Figure 3 will be yieldingly resisted by the fluid between the plunger and cylinder end, and a movement of the piston in a reverse direction will be yieldingly resisted by the spring 18. Thus it will be seen that the movement of the tread or rim member 6 with respect to the body portion will be resisted by a plurality of shock absorbing devices, some of the devices working on the air or fluid cushion and the others on the spring cushion.

The ends 17 of one-half of the cylinders are bifurcated as at 20 and the ends 17 of the other cylinders have a projection 21 formed thereon of a thickness slightly less than the space between the ends 20. Two cylinders or shock absorbing devices are connected with each projection or arm 16 by having one cylinder having the bifurcated portion and the other having the projection 21 secured therein by a pivot bolt 22, the ends 20 and 21 being axially bored.

The cylinders then extend in opposite directions from their projections 16 and have the ends of their piston rods 13 connected with the next arm 11 of the section 8 adjacent the side to which the projection 16 is secured that the cylinders are attached to. The ends of the piston rods 13 are provided with an interforked pivotal connection with the arms 11, somewhat similar to the manner of connecting the cylinders with the projection 16, one piston rod being bifurcated as at 23 and the other fitted therebetween as at 24, both being axially bored to receive a pivot bolt 25 which passes through said bores and the bifurcated end of the arms 11.

The bolts 22 and 25 are provided with grease or oil cups 26, while the pistons 14 may also be provided with suitable means for lubrication to prevent friction and permit the easy operation thereof. The caps 19 have threaded connections with the cylinders and in order to prevent the disconnection of said caps I provide the edges thereof with serrations or teeth 27 adapted to be engaged by spring dogs or pawls 28 carried by the cylinders.

From the foregoing description taken in connection with the accompanying drawing it will be readily apparent that I provide a device of the class described which will efficiently absorb all the shocks imparted thereto and one which will be practical for the purpose described. It will be understood that if desired, a spring similar to spring 18 may be positioned between the cylinder end 17 and the piston 14.

What I claim as my invention is:

1. A vehicle wheel comprising a body member composed of a pair of complementary sections having radial outwardly extending spaced arms, the arms of one section being staggered circumferentially with respect to the arms of the other section, whereby the arms of one section occupy positions opposite the spaces between the arms of the other section; a tread member surrounding said body member, provided with two sets of radial inwardly extending spaced arms in axial alinement with said body arms, the arms of one set being staggered circumferentially with respect to the arms of the other set whereby they may occupy positions medially between said body arms; and pivoted yielding connections between adjacent axially alined arms of said tread and body members.

2. A vehicle wheel comprising a body member composed of a pair of complementary sections having radial outwardly extending spaced arms, the arms of one section being staggered circumferentially with respect to the arms of the other section, whereby the arms of one section occupy positions opposite the spaces between the arms of the other section; a tread member surrounding said body member, provided with two sets of radial inwardly extending spaced arms in axial alinement with said body arms, the arms of one set being staggered circumferentially with respect to the arms of the other set whereby they may occupy positions medially between said body arms; and resilient connections between said body and tread members comprising closed cylinders pivotally connected to the arms of said tread member, and pistons working in said cylinders, provided with piston rods pivotally connected to the arms of said body member.

In testimony whereof I affix my signature.

PETER J. WEIRICH.